July 11, 1950     E. S. HUGHES ET AL     2,515,042
TORQUE AMPLIFIER
Filed Feb. 8, 1946
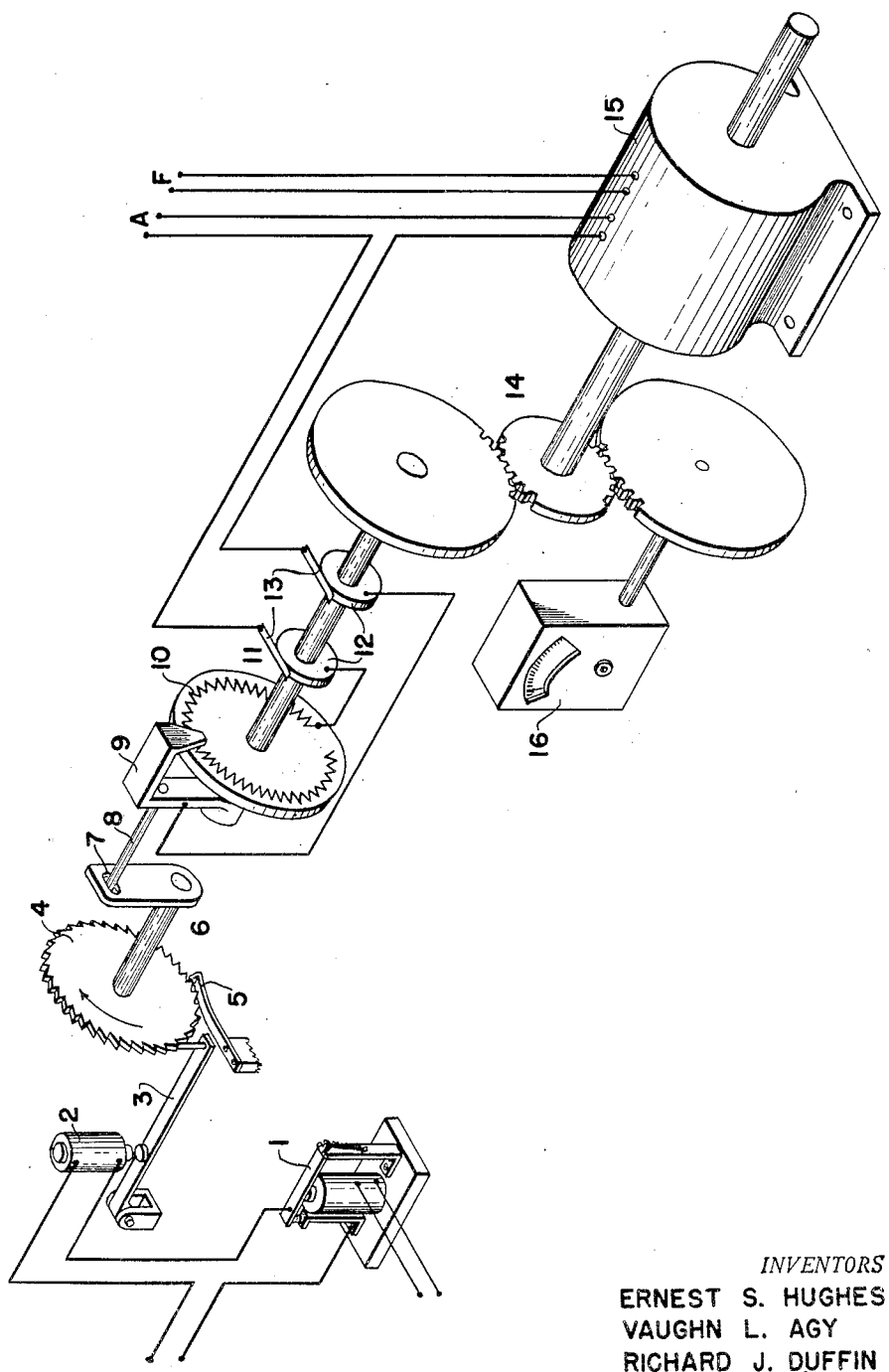
*INVENTORS*
ERNEST S. HUGHES
VAUGHN L. AGY
RICHARD J. DUFFIN
M. C. Hayes
By    *Attorney*

Patented July 11, 1950

2,515,042

UNITED STATES PATENT OFFICE 2,515,042

TORQUE AMPLIFIER

Ernest S. Hughes, Vestal, and Vaughn L. Agy, Queens Village, N. Y., and Richard J. Duffin, Washington, D. C., assignors to the United States of America as represented by the Secretary of the Navy Application February 8, 1946, Serial No. 646,444

1 Claim. (Cl. 318—73)

This invention relates to a torque amplifier or servo-system for converting rotation at low torque to equivalent rotation at higher torque or for following a rotating element of low torque and producing a corresponding rotation capable of a certain amount of useful work.

An object of the invention is to control the speed of rotation of an electric motor so that it faithfully represents a value at an increased power or torque.

Less comprehensive objects are included, as will be apparent from the following disclosure.

In many instances it is desirable to enable a certain rotation to be reproduced or followed, as where the rotation of a controlling shaft indicative of a condition or value is of such low power as to be incapable of giving a useful result. For example, a propeller type log to be towed in the water behind a vessel rotates at a speed varying with the speed of the vessel through the water. If a load be placed upon the propeller, it will be caused to drag and thus to rotate at a slower speed than it should and therefore it is impossible to cause it to give a direct record of its operation, as by operating a train of gears in a recording mechanism. In this case it is desirable to provide a means operating at a speed directly proportional to the speed of the unloaded propeller but capable of any required amount of work, such as operating recording and/or indicating mechanism. It is such a device that is the subject of this invention.

It is contemplated that the propeller of the instance cited is capable of making and breaking contact in an electrical circuit of low voltage and current and at a frequency directly proportional to its rate of rotation.

Alternatively, the device to be described may be used to provide a rotation proportional to the frequency of electrical impulses received, even though no rotation is directly represented thereby.

The single figure of the drawing is a diagrammatic sketch illustrative of the invention.

In the drawing, 1 is a sensitive relay for receiving electrical signals. Relay 1 controls the operation of an electromagnet 2, the electromagnet being activated whenever the sensitive relay closes its circuit. A pivoted ratchet 3 operates step-wise a ratchet wheel 4 which is secured against opposite rotation by a detent 5. The arrangement is such that electrical impulses in the relay 1 will result in step-by-step rotation of ratchet wheel 4 in a single direction.

Secured to and rotating with ratchet-wheel 4 is a lever 6 slotted at 7 for operation of a crank 8. Crank arm 9 is rotatably mounted on a shaft 11 and has a projection in electrical contact with a circular resistance wire coil 10 secured to shaft 11. Elements 9 and 10 constitute a rheostat. Also secured to shaft 11 are collector rings 12 contacted by wipers 13. Shaft 11 is operated through a gear train 14 by a motor 15 which provides the direct output of the device.

By means of wipers 13, collector rings 12, and suitable connections shown, rheostat 9—10 is placed in the armature circuit of the motor 15, and thus will affect the speed of the motor. At 16 there is shown a tachometer for indicating the speed of the motor.

Since resistance in the armature circuit may be varied by relative motion between 9 and 10, there is provided a means whereby the motor speed is controlled in accordance with the rate of the incoming electrical impulses. Vibration of the electromagnet 2 will cause arm 9 to advance over resistance wire 10. In the preferred embodiment, this results in decreasing the resistance in the armature circuit and a consequent increase in speed of the motor 15. However, increased speed of the motor tends to rotate resistance wire 10 in such direction as to slow the motor. A point will be reached where the speed of the motor is exactly equivalent to the rate of incoming signals.

In operation, assuming rotation of the motor 15 and incoming signals to the relay 1, the system will be rotating smoothly, and the shafts rotating at the same speed. If signals begin coming in at an increased rate operation of ratchet-wheel 4 will cause crank 9 to move over the resistor in such a direction as to decrease resistance in the armature circuit of the motor 15. This will result in a speeding of said motor, by which action the resistor 10 will be brought up to the same speed as the arm 9 is rotating. Oppositely, a slowing of the signals will result in a slowing of the motor.

Numerous changes in detail are contemplated. If the incoming signal may be of sufficient strength directly to operate the ratchet magnet 2, the sensitive relay 1 may be omitted. A further modification is possible in that the motor speed might be controlled by a rheostat in its field circuit, rather than in the armature circuit as shown. In this case it would be arranged so that it will operate oppositely from the arrangement shown, i. e. an increase in resistance would cause the motor to operate at a higher speed.

Tachometer 16 is shown merely for an example of the ways in which the output of the motor may be employed, and forms no essential part of the combination. Another example would be a total distance recording device, or other record-making or indicating instrument pertinent to the value represented by the incoming electrical impulses, or rotation.

In case a controlling shaft is capable of sufficient output to operate the rheostat directly, all mechanism to the left of the crank arm 6 may be omitted.

We claim:

In a device for operating an electric motor at a speed controlled by the repetition rate of a series of electrical impulses, a first shaft, a radial contact arm mounted on said shaft, a ratchet wheel mounted on said shaft, a ratchet pawl associated with said ratchet wheel and adapted to rotate said ratchet wheel one notch at each movement thereof, electro-magnetic means associated with said pawl and adapted to move said pawl, means for energizing said electromagnetic means in response to said electrical impulses, a direct current electric motor, a second shaft driven by said electric motor coaxially positioned adjacent said first shaft, a toric resistance element carried by said second shaft and in electrical contact with said contact arm, and circuit means connecting said toric resistance element in series with the armature of said motor to control the rotational speed thereof, whereby said ratchet wheel is rotated by said electromagnetic means and the motor speed is controlled by relative rotation of said first and second shafts and the speed of said first shaft is controlled by the repetition rate of said electrical impulses.

ERNEST S. HUGHES.
VAUGHN L. AGY.
RICHARD J. DUFFIN.

REFERENCES CITED

The following references are of record in the file of this patent:

UNITED STATES PATENTS

| Number | Name | Date |
|---|---|---|
| 1,506,765 | Merrill | Sept. 2, 1924 |
| 1,521,824 | Merrill | Jan. 6, 1925 |
| 2,075,103 | Edwards et al. | Mar. 30, 1937 |

FOREIGN PATENTS

| Number | Country | Date |
|---|---|---|
| 449,616 | Great Britain | June 30, 1936 |